M. L. CANNON.
BELT TIGHTENER.
APPLICATION FILED JAN. 16, 1914.

1,142,874.

Patented June 15, 1915.
2 SHEETS—SHEET 1.

Witnesses
Wm. H. Mulligan.
Ross J. Woodward.

Inventor
Martin L. Cannon,
By
his Attorney

THE NORRIS PETERS CO., PHOTO-LITHO., WASHINGTON, D. C.

M. L. CANNON.
BELT TIGHTENER.
APPLICATION FILED JAN. 16, 1914.

1,142,874.

Patented June 15, 1915.
2 SHEETS—SHEET 2.

Witnesses
Wm. H. Mulligan
Ross J. Woodward

Inventor
Martin L. Cannon,
By Richard Niven,
his Attorney

UNITED STATES PATENT OFFICE.

MARTIN L. CANNON, OF PORTIS, KANSAS.

BELT-TIGHTENER.

1,142,874.  Specification of Letters Patent.  Patented June 15, 1915.

Application filed January 16, 1914. Serial No. 812,503.

*To all whom it may concern:*

Be it known that I, MARTIN L. CANNON, a citizen of the United States, residing at Portis, in the county of Osborne and State of Kansas, have invented certain new and useful Improvements in Belt-Tighteners, of which the following is a specification.

This invention relates to an improved belt tightener, and the principal object of the invention is to provide a belt tightener having improved means for pivotally mounting roller supporting yokes so that the rollers will be held in engagement with one flight of an endless chain or belt holding the belt at the desired degree of tightness.

Another object of the invention is to so construct the supporting means for the yokes that a number of yokes may be mounted in alinement and hold a number of belts under tension.

Another object of the invention is to so construct the supporting means for the yokes that the different belts may be held under different degrees of tension if desired.

Another object of the invention is to provide a belt tightener which will be very cheaply manufactured and which can be very easily installed.

This invention is illustrated in the accompanying drawings wherein—

Figure 1:
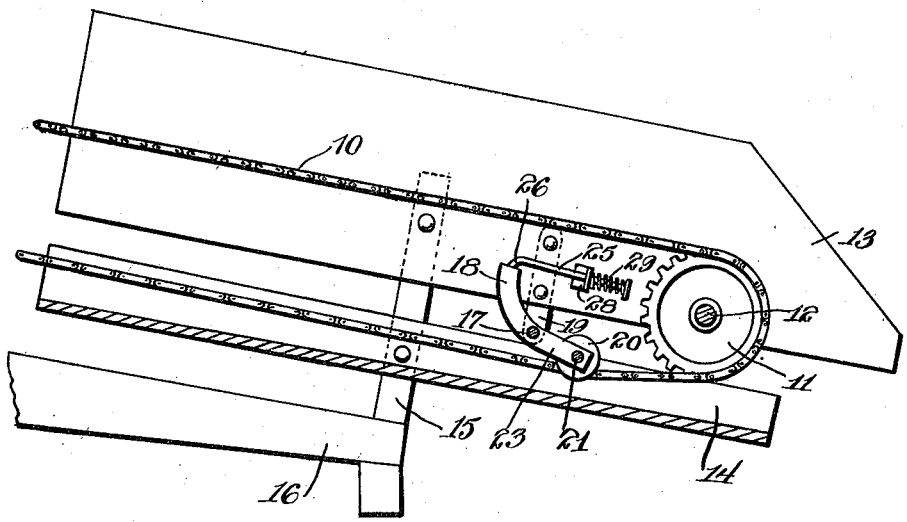
Figure 2:
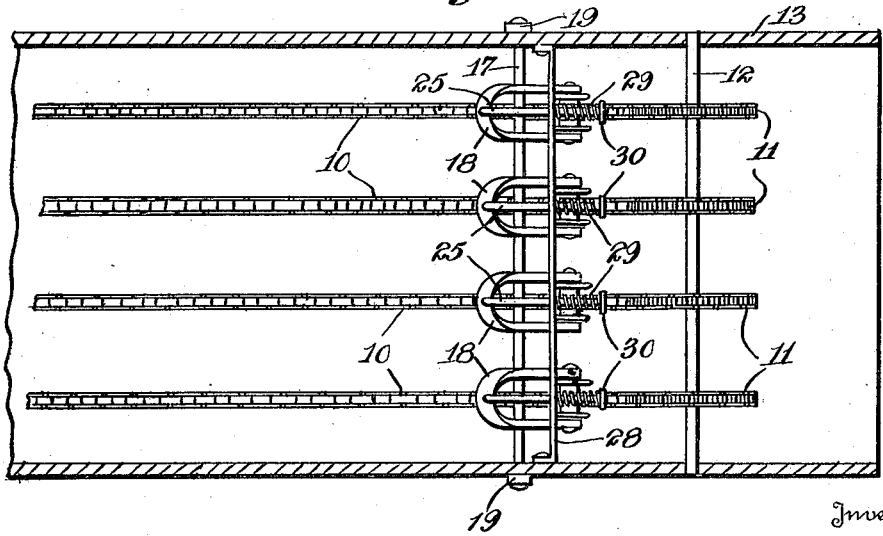
Figure 3:
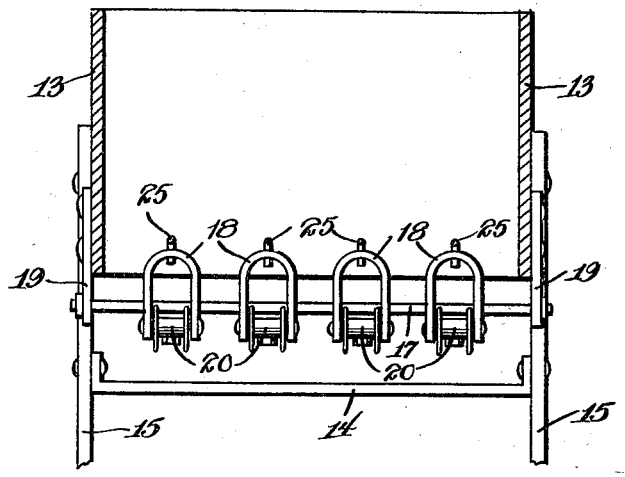
Figure 4:
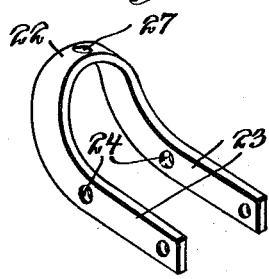
Figure 5:
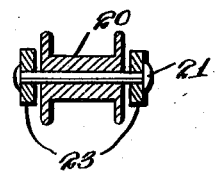

Figure 1 is a longitudinal sectional view showing the belt tightener in place. Fig. 2 is a top plan view of the improved belt tightener with the belt tightener applied to a number of belts; Fig. 3 is a transverse sectional view showing the belt tightener in elevation; Fig. 4 is a perspective view of one of the yokes; Fig. 5 is a sectional view showing the manner of mounting the rollers.

The endless belts or chains 10 pass around sprocket wheels or other rotatable supports 11 which are mounted upon a shaft 12 carried by the side walls 13 of the trough 14. The side walls and bottom of the trough are carried by standards 15 extending upwardly from the frame 16, only a fragment of the frame being shown since the frame does not form a part of my invention.

The pivot shaft 17 upon which the U-shaped yokes 18 are pivotally mounted is supported from the side walls 13 by means of the hangers 19 and extends transversely through the trough and beneath the upper and lower flights of the sprocket chains 10 so that the rollers 20 which are rotatably mounted upon the pins 21 may engage the lower flights of the sprocket chains. These yokes are preferably formed of heavy sheet metal blanks, each of which is bent to form a bridge 22 having curved arms 23 extending therefrom in spaced parallel relation. These arms are curved as shown in Fig. 1 so that when the yokes are pivotally mounted in the trough upon the shaft 17 which passes through the openings 24 they will have a construction somewhat similar to a bell crank lever. Rods 25 have their bent end portions 26 secured in the openings 27 formed in the yokes and extend through openings formed in a bridge 28 secured to the side walls of the trough. Spiral springs 29 are mounted upon the outer end portions of the rods 25 and are engaged by the nuts 30 which retain the springs upon the rods and constitute adjustable abutments for the outer ends of the springs.

In the operation of this tightener, the rod 17 is connected with the side walls of the trough by means of the hangers 19 and the rods 25 are passed through openings formed in the bridge 28 which is then secured to the inner faces of the side walls. After the rollers 21 have been placed upon the lower flight of the chains 20, the springs 29 are put in place and the abutment nuts are then screwed upon the threaded end portions of the rods 25 until the springs have been compressed a sufficient amount to cause the rollers to be held in tight engagement with the chains. These springs are independently adjustable and therefore the different yokes may be held in engagement with their respective chains to place different amounts of pressure upon the various chains. It will thus be seen that when one spring is placed under too great a tension, it may be relieved without the tension of the remaining springs being effected in any way. It will also be seen that if desired the tension may be entirely removed from any one of the springs and thus permit its belt to hang loosely.

This belt tightener can be very easily applied to belts or chains which are now in use since in order to put the tightener in place it is simply necessary to connect the pivot rod 17 and bridge 28 with the frame work supporting the chains and then bring the rollers into engagement with the chains by adjustable nuts 30.

It is, of course, obvious that if desired the belt tightener may be provided with a greater number of yokes than shown in the drawings, or if desired, only one yoke may be used.

What is claimed is:

A belt tightener comprising a bearing rod, a cross bar extending parallel to said bearing rod, a yoke formed from a U-shaped blank of sheet material bent to provide a bridge having curved arms extending therefrom, the bridge being provided with an opening and the arms being provided with openings through which said bearing rod passes to pivotally mount said yoke and having their free end portions provided with openings, a roller having its pivot pin passing through the openings in the end portions of said arms, a rod slidably mounted in said cross bar and having one end portion bent at an angle and secured in the opening formed in the bridge of said yoke, an abutment carried by last mentioned rod, and a spring mounted upon said last mentioned rod between said cross bar and abutment to yieldably hold said last mentioned rod in a position to retain said yoke in a normal position.

In testimony whereof I affix my signature in presence of two witnesses.

MARTIN L. CANNON.

Witnesses:
 Jos. Lomas,
 A. Nicholson.

Copies of this patent may be obtained for five cents each, by addressing the "Commissioner of Patents, Washington, D. C."